United States Patent Office 3,428,590
Patented Feb. 18, 1969

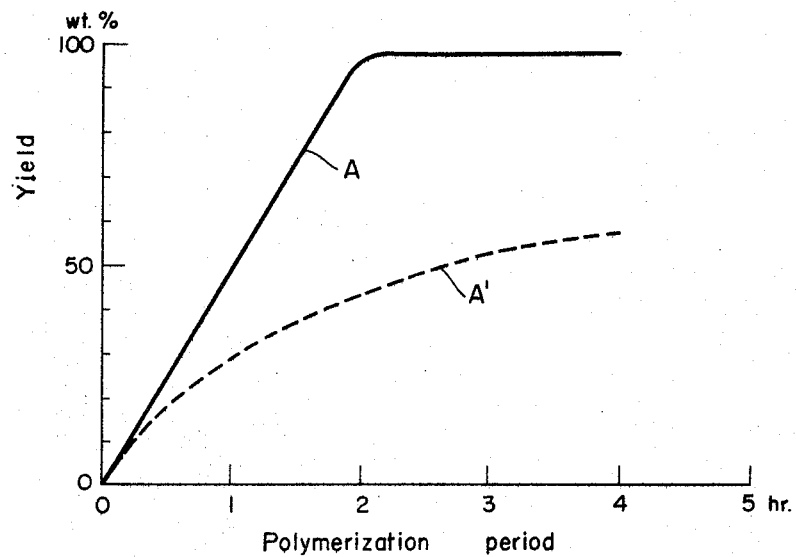

3,428,590
PROCESS FOR THE PRODUCTION OF TRIOXANE COPOLYMERS
Yoshiaki Yamase, Tokyo, and Teruo Kutsuma, Kawasaki, Japan, assignors to Yawata Chemical Industry Co., Ltd., Tokyo, Japan
Filed Jan. 18, 1966, Ser. No. 521,289
Claims priority, application Japan, Jan. 22, 1965, 40/2,997, 40/2,998; Mar. 3, 1965, 40/16,895; Apr. 6, 1965, 40/19,720
U.S. Cl. 260—67                      10 Claims
Int. Cl. C08g 1/04, 1/12

ABSTRACT OF THE DISCLOSURE

The present invention relates to an improvement in a process for production of trioxane copolymers, cationically copolymerized with a copolymerizable monomer in the presence of sulfone, cyclic carboxylic anhydride or cyclic oxalic ester, for example, dimethylsulfone, tetrahydrothiophene-1,1-dioxide, succinic anhydride, diglycolic anhydride, and ethylene oxalate, which accelerates the copolymerization reaction and increases the yield and molecular weight of the resultant copolymer.

---

The present invention relates to a process for the production of trioxane copolymers and more particularly to a process for producing trioxane copolymers containing predominantly recurring oxymethylene units therein copolymerizing trioxane and a monomer which can be copolymerized with trioxane, wherein a specific compound is present in the polymerization system as an accelerator to accelerate the copolymerization reaction and to increase the yield and molecular weight of copolymers.

Trioxane which is known as a cyclic trimer of formaldehyde is a volatile colorless needle or rhombic hexahedron having a melting point of 61–62° C. and a boiling point of 114° C. and has a chloroform-like or camphor-like fragrance. It has already been known that a high molecular weight polyoxymethylene containing the recurring oxymethylene units (—OCH$_2$—) is easily formed from substantially anhydrous trioxane in contact with a cationic trioxane polymerization catalyst such as boron trifluoride.

It has also been disclosed in many reports and patent specifications that various copolymers containing predominantly recurring oxymethylene units therein are obtained from trioxane and various monomers by the catalytic action of cationic trioxane polymerizing catalyst. The groups of known monomers which can be copolymerized with trioxane (such monomers as are capable of copolymerizing with trioxane will be simply "comonomers" hereinafter) are generally classified for convenience's sake as follows;

(1) Cyclic ethers (U.S. Patent 3,027,352; British Patents 956,457 and 972,425; and Belgian Patents 626,154 and 635,754),
(2) Spirocyclic orthcarboxylic esters (Japanese patent publication 3,708/65),
(3) Vinyl compounds (U.S. Patent 3,087,913; British Patents 911,960 and 926,904; Belgian Patents 610,223, 610,580 and 635,754),
(4) Cyclic esters (British Patent 926,904),
(5) Cyclic siloxanes (Japanese patent publication 17,080/64),
(6) Aldehydes (Belgian Patent 609,208), and
(7) Others (U.S. Patent 3,012,990 and Belgian Patent 651,645).

The details of these comonomers will be explained below in detail.

Such trioxane copolymers have excellent thermal stability but the yield of the copolymer therefor are generally low. Further as is well known, the thermal stability of such copolymers is generally increased as the ratio of the comonomers to trioxane in the copolymers is increased. However, as the content of the comonomers is increased, the yield of the copolymers is extremely reduced, which will be shown clearly in below-mentioned examples. In this case, further, there is a tendency that the molecular weight of the copolymers is reduced.

As mentioned above, there are drawbacks in the conventional processes that the reduction of production cost is prevented and in the worst case the commercial production of copolymers having good properties becomes sometimes difficult because of the low polymerization yield.

Therefore, an object of this invention is to provide a material for accelerating the copolymerization reaction of trioxane and comonomers.

Another object of this invention is to provide a process for adding said material for accelerating to the copolymerization reaction of trioxane comonomers to the reaction system.

Further objects of this invention will become clear from the following detailed descriptions of this invention.

Now, the materials for the accelerating to the copolymerization reaction in this invention means a kind of "additives" which is added into the reaction system before or after initiating the copolymerization reaction, thereby accelerating copolymerization reaction and increasing the yield and molecular weight of the copolymer.

Thus, according to this invention, at least one compound selected from the group consisting of sulfones, cyclic carboxylic anhydrides, and cyclic oxalic esters is used as the accelerator.

The sulfones in this invention are linear or cyclic compound having from 1 to 3 sulfonyl group (—SO$_2$—) and no ethylenically unsaturated bonds in the molecule and may have therein the group such structure as ether, thioether, acetal, thioacetal, ester, thioketon, keton or thioketon. Further, sulfone derivatives containing halogens, nitro groups or cyano groups are also included in the sulfones in this invention. These sulfones may be used individually or as a mixture thereof in a suitable ratio.

The typical examples of these sulfones are dimethylsulfone, diethylsulfone, diphenylsulfone, bis (methylsulfonyl) methane, tetrahydrothiophene-1, 1-dioxide, 2, 4-dimethyltetrahydrothiophene-1, 1-dioxide, 3-methyltetrahydrothiophene-1, 1-dioxide, 2, 5-dihydrothiophene-1, 1-dioxide, 3-methyl-2, 5-dihydrothiophene-1, 1-dioxide, 1, 3, 5-trithiane-1, 1-dioxide, 1, 3, 5-trithiane-1, 1, 3, 3-tetraoxide, 1, 3, 5-trithiane-1, 1, 3, 3, 5, 5-hexaoxide and the like. The above-mentioned sulfones have a specific function as accelerators, and similar compounds such as dimethyl sulfate have no such function as shown below in comparative examples.

The cyclic carboxylic anhydride in this invention is the compound having from 1 to 2 cyclic carboxylic anhydride structure in the molecule as shown in the following general formula

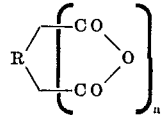

wherein R represents the 2n-valent residual group of a hydrocarbon consisting of at least two carbon atoms, or the 2n-valent residual group of a compound consisting of at least two carbon atoms, hydrogen atoms, oxygen atoms and/or sulfur atom (said oxygen atom and/or sulfur atoms being present in the structure such as, ether, thioether, acetal, thioacetal, ester, thioester, ketone or thioketone) or the halogen-nitro- or cyano-derivative of the residual group, and n is an integer from 1 to 2. These cyclic carboxylic anhydrides may be used alone or as a mixture thereof in a suitable ratio.

The examples of these cyclic carboxylic anhydrides are succinic anhydride, glutaric anhydride, adipic anhydride, maleic anhydride, methylmaleic anhydride, itaconic anhydride, tetrahydrophthalic anhydride, cyclohexanedicarboxylic anhydride, phthalic anhydride, naphthalene dicarboxylic anhydride, diphenic anhydride, pyromellitic anhydride, diglycolic anhydride, tetrachlorophthalic anhydride, nitrophthalic anhydride and the like.

The above-mentioned cyclic carboxylic anhydrides have a specific function as the accelerators, and other non-cyclic carboxylic anhydrides such as acetic anhydride have no such function as shown below in comparative examples.

Further, the cyclic oxalic ester in this invention means the cyclic six-membered oxalic ester of an alkylene glycol, substituted alkylene glycol, cycloalkylene glycol, substituted cycloalkylene glycol, catechol, or substituted catechol. These cyclic oxalic esters may contain halogen atoms, nitro groups or cyano groups. These cyclic oxalic esters may be used alone or as a mixture thereof in a suitable ratio.

The typical examples of the cyclic oxalic esters are ethylene oxalate, methoxyethylene oxalate, propylene oxalate, hexahydrocatechol oxalate, catechol oxalate and the like.

The above-mentioned cyclic oxalic esters have a specific function as accelerators, and other non-cyclic oxalic esters such as dimethyl oxalate have no such function as shown below in comparative examples.

The effective amount of the accelerators to be added to the monomers is 0.1–50 mol percent but the acceleration effect is influenced by the kind and amount of the accelerators, the kind and amount of comonomers, and the reaction conditions.

As mentioned above, by adding to the reaction system the accelerator, that is, the sulfone, the cyclic carboxylic anhydride or the cyclic oxalic ester, the copolymerization reaction rate yield and molecular weight of copolymers can be remarkably increased and the induction period can generally be shortened. However, in order to ensure more firmly the acceleration effect and to increase it more markedly, it is desirable to mix the accelerator with trioxane as homogeneously as possible prior to the initiation of copolymerization reaction. Comonomers may be added (1) all together with the accelerator and trioxane, (2) a portion with the accelerator and trioxane and the rest after the initiation of the copolymerization reaction, or (3) all after initiation. However, the acceleration effect is also obtained slightly by adding the accelerator to the reaction system after the initiation.

It has been well known in the art that trioxane to be used in the copolymerization reaction should be substantially anhydrous. Substantially anhydrous trioxane may be prepared by the process described, for example, in U.S. Patent 3,176,023.

The comonomers will be explained in detail.

(1) Cyclic ethers.—The cyclic ether of this invention is one having at least one ring wherein one ether bond or thioether bond is present and the ring skeleton consists of at least carbon oxygen, and/or sulfur. The ring may have at least one unsaturated bond and the carbon atom of the ring may be common to other ring. Further, the cyclic ether may be substituted with a group, such as an alkyl, a haloalkyl, an aryl, and an alkoxy group. It should be understood that cyclic acetals are included in the cyclic ethers in the specification of this invention. However, from the cyclic ethers are excluded raw material trioxane and orthocarboxylic acid spirocyclic esters shown below.

Particularly preferable examples of the cyclic ethers are ethylene oxide, propylene oxide, epichlorohydrin, 1-butene oxide, 1,3-butadiene-1-oxide, butadiene dioxide, dicyclopentadiene dioxide, 3-vinylcyclohexene dioxide, trimethylene oxide, 3,3-bis(chloromethyl)oxethane, tetrahydrofuran, tetrahydropyrane, dioxolan, 1,3-dioxane, 4-phenyl-1, 3-dioxane, 1,4-butanediol formal, 2-butene-1, 4-diol formal, o-xylylene glycol formal, pentaerythritol diformal, propylene sulfide, trithiane, monothiodioxalane, bis(β-hydroxyethyl)sulfide formal, and the like.

(2) Spirocyclic orthocarboxylic esters.—The spirocyclic orthocarboxylic ester of this invention is the compound having the specific structure shown by the following formula

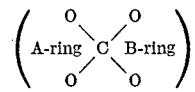

wherein ring A represents an at least four-membered ring composed of at least 3 carbon atoms and at least one oxygen atom or sulfur atom. Further, ring A may contain unsaturated bonds or may be substituted with various groups, such as an alkyl, haloaryl, an alkoxy and alkylidene.

Ring B represents an at least five-membered ring composed of at least 3 carbon atoms and at least two oxygen atoms or sulfur atoms. Further, ring B may have unsaturated bonds and may have various substituents as in ring A.

The orthocarboxylic acid spirocyclic ester may be prepared, for example, by the condensation reaction of a lactone and epoxide.

The preferred examples of the orthocarboxylic acid spirocyclic esters are 1,4,6-trioxaspiro(3,4)octane, 2-methyl-1,4,6-trioxaspiro(3,4)octane, 1,4,6-trioxaspiro(4,4)nonane, 2-methyl-1,4,6-trioxaspiro(4,4)nonane, 2 - (chloromethyl)-1,4,6-trioxaspiro(4,4)nonane, 2,7-dimethyl-1,4,6-trioxaspiro(4,4)nonane, 2-methylene - 1,4,6 - trioxaspiro(4,4)nonane, 2 - (phenoxymethyl)-1,4,6-trioxaspiro(4,4) nonane, 1,4,6-trioxaspiro(4,4)nonane-7-ene, 1,4,6-trioxaspiro(4,5)decane, 2 - methyl-1,4,6-trioxaspiro(4,5)decane, 2 - (chloromethyl)-1,4,6-trioxaspiro(4,5)decane, 1,4,6-trioxaspiro(4,6)undecane, 2-methyl - 1,4,6 - trioxaspiro(4,6) undecane, 2-(chloromethyl)-1,4,6-trioxaspiro(4,6)undecane, 2,3 - dimethyl - 1,4,6 - trioxaspiro(4,6)undecane, 2-(phenoxymethyl)-1,4,6-trioxaspiro(4,6)undecane and the like.

(3) Vinyl compounds.—The vinyl compound of this invention is a compound having the vinyl group but includes the compound in which the hydrogen atom at the α-position and/or β-position to the unsaturated bond is substituted with a group such as an alkyl, and an aryl group.

The typical vinyl compounds to be copolymerized with trioxane according to this invention are vinyl ethers, aromatic vinyl compounds, acrylonitriles, N-vinyl compounds, vinyl aldehydes and olefins.

Particularly preferable examples of the vinyl compounds are vinylmethyl ether, vinylethyl ether, vinylisobutyl ether, vinylpropenyl ether, divinyl ether, methoxymethylvinyl ether, styrene, vinyltoluene, divinylbenzene, α-methylstyrene, stilbene, indene, cumarone, acenaphthylene, thionaphthene, acrylonitrile, methacrylonitrile, N-vinyl-α-pyrrolidone, N-vinyl-ε-caprolactam, N-vinyl carbazole, acrolein, methacrolein, isobutylene and the like.

(4) Cyclic esters.—The cyclic ester of this invention is one having at least one ring wherein one ester bond or thioester bond in the ring is present and the ring skeleton consists of at least carbon, oxygen and/or sulfur. The ring may have at least one unsaturated bond and the carbon atoms composing the ring may be common to other ring. Further, such a cyclic ester may be substituted with an alkyl group, a haloalkyl group, an aryl group, an alkoxy group and the like. The particularly preferable cyclic esters of this invention are β-propiolactone, diketene, γ-butyrolactone, δ-valerolactone, β-methyl-δ-valerolactone, ε-caprolactone, dioxanone, etc.

(5) Cyclic siloxanes.—The cyclic siloxane in this invention is the compound shown by the following formula

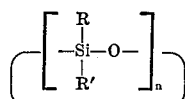

wherein R and R' each represents a hydrogen atom or an alkyl group and $n$ is an integer higher than 3. The cyclic siloxanes of this invention may be prepared by distilling the hydrolyzed product of chlorosilane. The particularly preferable cyclic siloxane is octamethylcyclotetrasiloxane.

(6) Aldehydes.—The aldehyde in this invention is a compound having the aldehyde group and is preferably an aldehyde having an electronegative substituent. The preferable examples of the aldehydes are formaldehyde, acetaldehyde, chloral, benzaldehyde, anisaldehyde and cinnamaldehyde.

(7) Others.—Cyclic carbonates, such as ethylene carbonate, propylene carbonate, and cyclohexanediol carbonate; ketenes, such as ketene and dimethylene ketene; isocyanate compounds, such as phenylenediisocyanate and toluene-2,4-diisocyanate; and aromatic compounds such as naphthalene, mesitylene and 2,4-dichlorophenol may be used as the comonomer.

The above comonomers may be at least one member selected from the same group or may be at least two members selected from at least two groups. The amount of the comonomers is usually 0.1–50 mol percent, preferably 0.5–20 mol percent based on trioxane.

Further, as the cationic trioxane polymerization catalyst in this invention may be used every known catalyst for the cationic polymerization of trioxane. The following are preferable examples of the cationic trioxane polymerization catalyst of this invention:

(1) Friedel-Crafts catalysts.—For example, boron trifluoride, stannic chloride, ferric chloride, boron trichloride and stannic bromide.

(2) The coordinate complexes of the Friedel-Crafts catalyst with water or a compound wherein the electron donor atom is oxygen or sulfur.—For example, boron trifluoride diethyl etherate, boron trifluoride dibutyl etherate, boron trichloride hydrate and ferric chloride diethyl etherate.

(3) The coordinate complexes of boron trifluoride with a weakly basic nitrogen compound wherein the electron donor atom is nitrogen.—For example, boron trifluoride-diphenylamine.

(4) Substituted aryldiazonium fluoroborates.—For example, para-nitrobenzenediazonium fluoroborate.

(5) The oxonium salts of the Friedel-Crafts catalysts.—For example, triethyloxonium borofluoride, triethyloxonium tetrachloroalminate, and triethyloxonium hexachloroantimonate.

(6) Halogens or compounds of halogens.—For example, bromine, iodine, and iodine monobromide.

(7) Inorganic or organic strong acids and the coordinate complexes of the acids and boron trifluoride.—For example, dihydroxyl fluoroboric acid, polyphosphoric acid, and boron trifluoride-dihydrofluoroboric acid, etc.

The amount of the cationic trioxane polymerization catalyst varies depending upon the activity of the catalyst, and is generally 0.001–1.0% by weight, preferably 0.003–0.1% by weight, based on trioxane.

When the amount of the catalyst is sufficient, a remarkable effect appears even in the presence of only a small amount of the accelerator; namely the yields of copolymers is increased markedly and sometimes becomes almost quantitative. However, when the amount of the catalyst is less, a large amount of the accelerator is required for increasing the polymerization yield.

Further, when the amount of the trioxane polymerization catalyst is kept constant, the polymerization rate and the polymerization yield are increased as the amount of the accelerator is increased. This is explained referring to FIG. 1 in the accompanying drawings. FIG. 1 shows the relation between the reaction period and the yield of the copolymer in the presence or absence of the accelerator (dimethylsulfone) in the copolymerization of trioxane and spirocyclic orthocarboxylic ester as illustrated in Example 2. The symbol A in FIG. 1 is the experimental result in the case where 1.9 parts of dimethylsulfone is added to 100 parts of trioxane, 100 parts of cyclohexane, 2 parts of 1,4,6-trioxaspiro (4,4)nonane and 0.05 part of boron trifluoride diethyl etherate and the symbol A' is the experimental result about the case where dimethylsulfone is not added.

The copolymerization reaction may be carried out in the presence or absence of an inert solvent and in every case there is observed the co-existence effect of the accelerator. In addition, the experimental result in the absence of solvent, that is, the result of bulk copolymerization is shown in Example 4.

As the inert solvent in this invention may be used compounds such as saturated aliphatic hydrocarbons, saturated alicyclic hydrocarbons, aromatic hydrocarbons and the chlorine derivatives thereof. Among the solvents, one having a small dielectric constant, such as hexane and cyclohexane, is the most effective as accelerator. The reaction temperature is generally in the range of 0 to 100° C. and preferably in the range of 40 to 75° C. The reaction pressure is preferably atmospheric pressure but may be lower or higher. In general, however, it is preferable to carry out the reaction in an inert atmosphere and under moisture-free conditions.

According to conventional method, the copolymer thus obtained may be pulverized in a ball mill and, washed with 1% aqueous ammonia, hot water, and then warm acetone, and dried under reduced pressure to yield the powdered copolymer.

The powdered copolymer can be highly stabilized by applying the treatment of thermal decomposition to remove unstable parts in the copolymer, and, if necessary, by incorporating various stabilizers, such as aromatic amines, phenols, amides, dithiocarbamates.

The copolymers obtained by this invention are thus inter alia useful moulding materials.

The following examples non-limitatively illustrate this invention. "Part" in each example means "part by weight."

EXAMPLE 1

This example shows the acceleration effect reaction of the accelerator in the copolymerization of trioxane and a cyclic ether.

Thus, 100 parts of trioxane, the cyclic ether in an amount shown in Tables 1, 2 and 3 and the accelerator in an amount shown in them were mixed with 100 parts of cyclohexane and the mixture was heated to 70° C. in a dried nitrogen atmosphere. After adding into the mixture 0.05 part of boron trifluoride diethyl etherate, the mixture was copolymerized for 2 hours at 70° C. Thereafter, the reaction was stopped by adding a small amount of water. Thus formed copolymer was filtered, washed once with warm acetone containing 1% ethanolamine and then several times with warm acetone, and then dried in vacuo at 60° C.

The yield of copolymer is shown by weight percent based on the sum of the initial amounts of trioxane and comonomer.

Thus obtained copolymer was confirmed to be the desired copolymer by infrared absorption spectrum analysis and elementary analysis. The intrinsic velocity of the copolymer was measured at 60° C. as the 0.5% p-chlorophenol solution containing 2% of α-pinene. Further, the thermal decomposition rate $K_{222}$ (percent/min.) at 222° C. was measured by putting 0.2 g. of the sample in a small glass ampoule (which was opened to the air through a capillary tube) and measuring by heating to 222° C., and shows the decomposition rate after the first rapid weight loss.

The similar procedure after the copolymerization was conducted in the below-described examples also. At that, the experimental data having no accelerator is different in each table since the lot of trioxane was different but in each table, a same lot of trioxane was used. Therefore, the comparison of the experimental data must be done in each table.

The experimental results obtained by using as the accelerators sulfones, cyclic carboxylic anhydrides, and cyclic oxalic esters are shown in Tables 1, 2 and 3 respectively.

TABLE 1.—ACCELERATION EFFECT OF SULFONE COMPOUND IN THE TRIOXANE-CYCLIC ETHER COPOLYMERIZATION REACTION

| Experiment number | Cyclic ether | | Sulfone | | Yield | Inherent viscosity | $K_{222}$ (Percent/min.) |
|---|---|---|---|---|---|---|---|
| | Kind | Part | Kind | Part | | | |
| 1 | Ethylene oxide | 1.96 | None | 0 | 37.2 | 0.73 | 0.20 |
| 2 | ---do--- | 1.96 | Dimethyl sulfone | 1.57 | 97.5 | 1.21 | 0.11 |
| 3 | ---do--- | 2.94 | None | 0 | 18.2 | 0.71 | 0.05 |
| 4 | ---do--- | 2.94 | Dimethyl sulfone | 4.20 | 91.2 | 1.40 | 0.02 |
| 5 | Epichlorohydrine | 1.54 | None | 0 | 59.5 | 0.67 | |
| 6 | ---do--- | 1.54 | Dimethyl sulfone | 1.57 | 98.5 | 1.07 | |
| 7 | Dioxolane | 3.29 | None | 0 | 73.6 | 0.90 | 0.04 |
| 8 | ---do--- | 3.29 | Dimethyl sulfone | 1.05 | 100.0 | 1.04 | 0.01 |
| 9 | ---do--- | 3.29 | 2,5-dihydrothiophene-1,1-dioxide | 2.50 | 100.0 | | |
| 10 | Diethylene glycol formal | 5.24 | None | 0 | 60.0 | 0.97 | |
| 11 | ---do--- | 5.24 | Dimethyl sulfone | 5.25 | 95.9 | 1.13 | |
| 12 | 2,5-dihydropyrane | 2.50 | None | 0 | 27.7 | 0.33 | |
| 13 | ---do--- | 2.50 | Dimethyl sulfone | 2.50 | 97.3 | 0.46 | |
| 14 | 2,5-dihydropyrane [1] | 0.62 | None | 0 | 21.9 | 0.94 | |
| 15 | Do.[1] | 0.62 | Dimethyl sulfone | 3.12 | 95.3 | 1.50 | |

[1] 3,4-epoxy-6-methylcyclohexylmethyl-3,4-epoxy-6-methylcyclohexane carboxylate.

TABLE 2.—ACCELERATION EFFECT OF CYCLIC CARBOXYLIC ANHYDRIDE IN THE TRIOXANE-CYCLIC ETHER COPOLYMERIZATION REACTION

| Experiment number | Cyclic ether | | Cyclic carboxylic anhydride | | Polymerization yield (wt. percent) | Inherent viscosity |
|---|---|---|---|---|---|---|
| | Kind | Parts | Kind | Parts | | |
| 1 | Ethylene oxide | 1.96 | None | 0 | 37.2 | 0.73 |
| 2 | ---do--- | 1.96 | Succinic anhydride | 2 | 98.6 | 1.12 |
| 3 | ---do--- | 1.96 | Diglycolic anhydride | 2.3 | 92.3 | 0.99 |
| 4 | Epichlorohydrine | 1.54 | None | 0 | 59.5 | 0.67 |
| 5 | ---do--- | 1.54 | Tetrahydrophthalic anhydride | 2.5 | 64.7 | 0.60 |
| 6 | Dioxolane | 3.29 | None | 0 | 73.6 | 0.90 |
| 7 | ---do--- | 3.29 | Diglycolic anhydride | 2.3 | 98.5 | 0.95 |

TABLE 3.—ACCELERATION EFFECT OF CYCLIC OXALIC ESTER IN THE TRIOXANE-CYCLIC ETHER COPOLYMERIZATION REACTION

| Experiment number | Cyclic ether | | Cyclic oxalic ester | | Yield (wt. percent) | Inherent viscosity |
|---|---|---|---|---|---|---|
| | Kind | Parts | Kind | Parts | | |
| 1 | Dioxolane | 3.29 | None | 0 | 67.1 | 0.63 |
| 2 | ---do--- | 3.29 | Ethylene oxalate | 2.5 | 91.8 | 0.70 |
| 3 | 2,5-dihydropyrane | 2.5 | None | 0 | 27.7 | 0.33 |
| 4 | ---do--- | 2.5 | Ethylene oxalate | 7.5 | 89.3 | |

EXAMPLE 2

This example shows the acceleration effect in the copolymerization reaction of trioxane and spirocyclic orthocarboxylic ester.

Thus, 100 parts of trioxane, the spirocyclic orthocarboxylic ester in an amount shown in Tables 4, 5 and 6, and the accelerator in an amount shown in them were mixed with 100 parts of cyclohexane and the mixture was heated to 70° C. in a dried nitrogen atmosphere. After addition into the mixture 0.05 part of borontrifluoride diethyl ethearte, the mixture was copolymerized for 2 hours at 70° C.

The experimental results obtained by using as the accelerator sulfone compounds, cyclic carboxylic anhydrides, and cyclic oxalic esters are shown in Tables 4, 5 and 6 respectively.

TABLE 4.—ACCELERATION EFFECT OF SULFONE IN THE TRIOXANE-SPIROCYCLIC ORTHOCARBOXYLIC ESTER COPOLYMERIZATION REACTION

| Exp. No. | Spirocyclic orthocarboxylic ester | | Sulfone | | Yield | Inherent viscosity | $K_{222}$ (percent/min.) |
|---|---|---|---|---|---|---|---|
| | Kind | Part | Kind | Part | | | |
| 1 | 1,4,6-trioxaspiro(4,4)nonane | 2.00 | None | 0 | 44.9 | 0.72 | 0.30 |
| 2 | ---do--- | 2.00 | Dimethyl sulfone | 1.88 | 93.6 | 1.35 | 0.06 |
| 3 | ---do--- | 4.00 | None | 0 | 32.0 | 0.47 | 0.27 |
| 4 | ---do--- | 4.00 | Dimethyl sulfone | 2.00 | 97.0 | 1.28 | 0.03 |
| 5 | 2-(chloromethyl)-1,4,6-trioxaspiro(4,4)nonane | 2.75 | None | 0 | 54.2 | 0.69 | |
| 6 | ---do--- | 2.75 | Dimethyl sulfone | 1.88 | 97.9 | 1.05 | |
| 7 | 1,4,6-trioxaspiro(4,6)undecane | 2.40 | None | 0 | 47.4 | 0.54 | 0.30 |
| 8 | ---do--- | 2.40 | Dimethyl sulfone | 1.38 | 94.0 | 1.21 | 0.08 |
| 9 | ---do--- | 2.40 | Tetrahydrothiophene-1,1-dioxide | 5.00 | 100.0 | 0.73 | |

TABLE 5.—ACCELERATION EFFECT OF CYCLIC CARBOXYLIC ANHYDRIDE IN THE TRIOXANE-SPIROCYCLIC ORTHOCARBOXYLIC ESTER COPOLYMERIZATION REACTION

| Experiment number | Spirocyclic orthocarboxylic ester | | Carboxylic cyclic anhydride | | Yield | Inherent viscosity | $K_{222}$ (percent/min.) |
|---|---|---|---|---|---|---|---|
| | Kind | Part | Kind | Part | | | |
| 1 | 1,4,6-trioxaspiro(4,4)nonane | 2.00 | None | 0 | 44.9 | 0.72 | 0.30 |
| 2 | do | 2.00 | Succinic anhydride | 2.00 | 92.0 | 1.16 | 0.16 |
| 3 | do | 4.00 | None | 0 | 32.0 | 0.56 | 0.62 |
| 4 | do | 4.00 | Succinic anhydride | 4.00 | 92.8 | 1.05 | 0.07 |
| 5 | 1,4,6-trioxaspiro(4,6)undecane | 2.40 | None | 0 | 47.4 | 0.54 | 0.30 |
| 6 | do | 2.40 | Succinic anhydride | 2.00 | 83.3 | 1.11 | 0.20 |

TABLE 6.—ACCELERATION EFFECT OF CYCLIC OXALIC ESTER IN THE TRIOXANE-SPIROCYCLIC ORTHOCARBOXYLIC ESTER COPOLYMERIZATION REACTION

| Experiment number | Spirocyclic orthocarboxylic ester | | Cyclic oxalic ester | | Polymerization Yield (wt. percent) | Inherent viscosity |
|---|---|---|---|---|---|---|
| | Kind | Part | Kind | Part | | |
| 1 | 1,4,6-trioxaspiro(4,6)undecane | 2.4 | None | 0 | 47.4 | 0.54 |
| 2 | do | 2.4 | Ethylene oxalate | 5 | 94.8 | 0.56 |

EXAMPLE 3

This example shows the acceleration effect of each accelerator in the copolymerization reaction of trioxane and a vinyl compound.

Thus, 100 parts of trioxane, the vinyl compound in an amount shown in Table 7, and the accelerator in an amount shown therein were mixed with 100 parts of cyclohexane and the mixture was heated to 70° C. in a dried nitrogen atmosphere. After adding into the mixture 0.05 part of boron trifluoride diethyl etherate, the mixture was copolymerized at 70° C. The results of this example are shown in Table 7.

EXAMPLE 4

This example shows the acceleration effect of each accelerator in the copolymerization reaction of trioxane and cyclic esters.

Thus, 100 parts of trioxane, the cyclic esters in an amount shown in Table 8 and the accelerator in an amount shown therein were mixed with 100 parts of cyclohexane and the mixture was heated to 70° C. in a dried nitrogen atmosphere. After adding into the mixture 0.05 part of boron trifluoride diethyl etherate, the mixture was copolymerized at 70° C. The results of this example are shown in Table 8.

TABLE 7.—ACCELERATION EFFECT OF ACCELERATOR IN THE TRIOXANE-VINYL COMPOUND COPOLYMERIZATION REACTION

| Experiment number | Vinyl compound | | Accelerator | | Reaction period (hr.) | Yield (wt. percent) | Inherent viscosity |
|---|---|---|---|---|---|---|---|
| | Kind | Part | Kind | Part | | | |
| 1 | Styrene | 4.0 | None | 0 | 2.0 | 54.3 | 0.58 |
| 2 | do | 4.0 | Dimethylsulfone | 1.8 | 2.0 | 87.6 | 0.66 |
| 3 | do | 4.0 | Phthalic anhydride | 1.8 | 2.0 | 62.5 | 0.57 |
| 4 | do | 4.0 | Ethylene oxalate | 1.8 | 0.5 | 82.4 | 0.49 |
| 5 | do | 20.0 | None | 0 | 2.0 | 20.2 | 0.24 |
| 6 | do | 20.0 | Dimethylsulfone | 10.0 | 2.0 | 74.4 | 0.29 |
| 7 | α-Methylstyrene | 5.0 | None | 0 | 20.0 | 0 | |
| 8 | do | 5.0 | Dimethylsulfone | 5.0 | 20.0 | 10.6 | |
| 9 | Indene | 5.0 | None | 0 | 2.0 | 21.3 | 0.31 |
| 10 | do | 5.0 | Dimethylsulfone | 5.0 | 1.5 | 89.0 | 0.31 |
| 11 | do | 5.0 | 2,5-dihydrothiophene-1,1-dioxide | 9.4 | 2.0 | 91.0 | 0.12 |
| 12 | do | 5.0 | Succinic anhydride | 8.0 | 0.5 | 92.5 | 0.23 |
| 13 | do | 5.0 | Diglycolic anhydride | 9.3 | 1.5 | 68.3 | 0.18 |
| 14 | Acrylonitrile | 2.5 | None | 0 | 1.0 | 40.6 | 0.76 |
| 15 | do | 2.5 | Tetrahydrothiophene-1,1-dioxide | 5.0 | 0.5 | 58.8 | 0.73 |
| 16 | do | 2.5 | Diglycolic anhydride | 5.0 | 1.0 | 95.4 | 0.82 |
| 17 | Iso-butylvinylether | 4.0 | None | 0 | 2.0 | 16.9 | 0.22 |
| 18 | do | 4.0 | Dimethylsulfone | 5.0 | 2.0 | 93.9 | 0.35 |

TABLE 8.—ACCELERATION EFFECT OF ACCELERATOR IN THE TRIOXANE-CYCLIC ESTER COPOLYMERIZATION REACTION

| | Cyclic ester | | Accelerator | | Reaction period (hr.) | Yield (wt. percent) | Inherent viscosity |
|---|---|---|---|---|---|---|---|
| | Kind | Part | Kind | Part | | | |
| Experiment number: | | | | | | | |
| 1 | α-Butyrolactone | 10 | None | 0 | 1.0 | 19.6 | 0.57 |
| 2 | do | 10 | 3-methyltetrahydrothiophene-1,1-dioxide | 10 | 1.0 | 53.6 | 0.82 |
| 3 | ε-Caprolactone | 11 | None | 0 | 2.0 | 28.9 | 0.66 |
| 4 | do | 11 | Dimethylsulfone | 5 | 2.0 | 81.0 | 1.14 |
| 5 | do | 11 | Diglycolic anhydride | 10 | 1.5 | 75.8 | 0.44 |
| 6 | do | 11 | Ethylene oxolate | 10 | 1.5 | 91.4 | |
| 7 | Phthalide | 15 | None | 0 | 0.5 | 21.0 | 0.35 |
| 8 | do | 15 | Succinic anhydride | 15 | 0.5 | 91.4 | 0.57 |

EXAMPLE 5

This example shows the acceleration effect of each accelerator in the copolymerization reaction of trioxane and other various comonomers.

Thus, 100 parts of trioxane, the comonomer in an amount shown in Table 9 and the accelerator in an amount shown therein were mixed with 100 parts of cyclohexane, and the mixture was heated to 70° C. in a dried nitrogen atmosphere. After adding into the mixture 0.05 part of boron trifluoride diethyl etherate, the mixture was copolymerized out at 70° C. The results are shown in Table 9.

EXAMPLE 7

This example shows the acceleration effect of the acceleration in the bulk copolymerization of trioxane.

Thus, 100 parts of trioxane, the comonomer in an amount shown in Table 11, and the accelerator in an amount shown therein were melted by heating to 70° C. in a dried nitrogen atmosphere. After the addition of 0.01 part of boron trifluoride diethyl etherate into the mixture, the mixture was copolymerized at 70° C. The results are shown in Table 11.

TABLE 9.—ACCELERATION EFFECT OF ACCELERATOR IN THE TRIOXANE—OTHER COMONOMER COPOLYMERIZATION REACTION

| Experiment number | Comonomer | | Accelerator | | Reaction period (hr.) | Yield (wt. percent) | Inherent viscosity | Note |
|---|---|---|---|---|---|---|---|---|
| | Kind | Part | Kind | Part | | | | |
| 1 | Acenaphtylene | 5 | None | 0 | 2.0 | 23.0 | 0.31 | |
| 2 | do | 5 | Dimethylsulfone | 5.0 | 0.5 | 84.9 | 0.36 | |
| 3 | do | 5 | Succinic anhydride | 10.0 | 0.5 | 92.8 | 0.40 | |
| 4 | Chloral | 5 | None | 0 | 0.5 | 25.7 | 0.38 | |
| 5 | do | 5 | Succinic anhydride | 7.5 | 0.5 | 100.0 | 0.50 | |
| 6 | do | 5 | Maleic anhydride | 2.6 | 0.5 | 58.8 | 0.45 | |
| 7 | do | 5 | Pyromellitic anhydride | 9.0 | 0.5 | 64.2 | 0.62 | |
| 8 | do | 5 | Dimethyl sulfone | 7.5 | 0.5 | 91.2 | 0.48 | |
| 9 | do | 5 | Tetrahydrothiophene-1,1-dioxide | 7.5 | 0.5 | 93.7 | 0.48 | |
| 10 | Ethylene carbonate | 15 | None | 0 | 0.5 | 56.7 | 0.79 | Cyclohexane 150 parts; $BF_3OEt_2$ 0.005 parts. |
| 11 | do | 15 | Dimethylsulfone | 5.0 | 0.5 | 79.2 | 0.73 | Do. |
| 12 | do | 15 | Hexahydrophthalic anhydride | 8.2 | 0.5 | 70.2 | 0.79 | Do. |

EXAMPLE 6

This example shows the acceleration effect of the accelerator in the ternary copolymerization reaction of trioxane.

TABLE 11.—ACCELERATION EFFECT OF ACCELERATOR IN THE TRIOXANE BULK COPOLYMERIZATION REACTION

| Experiment number | Comonomer | | Accelerator | | Reaction period (hr.) | Yield (wt. percent) | Inherent viscosity | Note |
|---|---|---|---|---|---|---|---|---|
| | Kind | Part | Kind | Part | | | | |
| 1 | 1,4,6-trioxaspiro (4,4) nonane. | 1 | None | 0 | 2.0 | 62.7 | 1.22 | $K_{222}=0.2\%$/min. |
| 2 | do | 1 | Dimethylsulfone | 0.94 | 2.0 | 93.0 | 1.15 | $K_{222}=0.1\%$/min. |
| 3 | Styrene | 10 | None | 0 | ⅓ | 62.0 | 0.53 | |
| 4 | do | 10 | 3-methyl-2,5-dihydro-thiophene-1,1-dioxide. | 5 | ⅓ | 73.7 | | |
| 5 | 2,3-dihydropyrane | 2.5 | None | 0 | 0.5 | 39.3 | 0.41 | $BF_3OEt_2$ 0.025 part. |
| 6 | do | 2.5 | Dimethylsulfone | 2.5 | 0.5 | 64.4 | 0.35 | Do. |
| 7 | do | 2.5 | Succinic anhydride | 7.5 | 0.5 | 81.3 | 0.24 | Do. |

Thus, 100 parts of trioxane, 2 parts of 1,4,6-trioxaspiro (4,4)-nonane, the diepoxide in an amount shown in Table 10, and dimethyl sulfone in an amount shown therein were mixed with 100 parts of cyclohexane, and the mixture was heated to 70° C. in a dried nitrogen atmosphere. After the addition of 0.05 part of boron trifluoride diethyl etherate into the mixture, the mixture was copolymerized for 2 hours at 70° C. The results are shown in Table 10.

TABLE 10.—ACCELERATION EFFECT OF ACCELERATOR IN THE TERNARY COPOLYMERIZATION REACTION OF TRIOXANE

| Experiment number | Diepoxide | | Amount of dimethyl sulfone (part) | Yield (wt. percent) | Inherent viscosity |
|---|---|---|---|---|---|
| | Kind | Part | | | |
| 1 | (1) | 0.155 | 0 | 22.1 | 0.50 |
| 2 | (1) | 0.155 | 1.9 | 39.2 | 0.65 |
| 3 | (1) | 0.155 | 3.8 | 100.0 | 1.11 |
| 4 | (2) | 0.97 | 0 | 33.6 | 0.61 |
| 5 | (2) | 0.97 | 1.9 | 56.9 | 0.70 |
| 6 | (2) | 0.97 | 2.8 | 100.0 | 0.68 |

¹ 3,4-epoxy-6-methylcyclohexylmethyl-3,4-epoxy-6-methylcyclohexane carboxylate.
² Ethyleneglycol diglycidyl ether.

EXAMPLE 8

This example shows that the accelerator is effective regardless of the kinds of the cationic trioxane polymerization catalysts used in the copolymerization reaction of trioxane.

Thus, 100 parts of trioxane, 2 parts of 1,4,6-trioxaspiro (4,4)nonane, were mixed with 100 parts of cyclohexane and the mixture was heated to 70° C. in a dried nitrogen atmosphere. After the addition of 0.032 mol. percent, based on trioxane the cationic trioxane polymerization catalyst shown in Table 12, the mixture was copolymerized for 2 hours at 70° C. The results are shown in Table 12.

Comparative example

This comparative example shows that compounds similar to the accelerators have no accelerating action as well as have rather harmful action to the trioxane polymerization reaction.

The accelerators or the similar compounds in an amount shown in Table 13. 100 parts of trioxane, and 100 parts of cyclohexane as the solvent were mixed and heated to 70° C. When 0.05 part of boron trifluoride TABLE 12.—RELATION BETWEEN THE KIND OF CATIONIC TRIOXANE POLYMERIZATION CATALYST AND THE ACCELERATION EFFECT IN THE TRIOXANE COPOLYMERIZATION REACTION

| | Cationic trioxane copolymerization catalyst | Amount of dimethyl-sulfone (part) | Yield (wt. percent) | Inherent viscosity | $K_{222}$ (percent/min.) |
|---|---|---|---|---|---|
| Experiment number: | | | | | |
| 1 | Boron trifluoride diethyl etherate | 0 | 44.9 | 0.72 | 0.3 |
| 2 | do | 1.88 | 93.6 | 1.35 | 0.06 |
| 3 | p-Nitrobenzene diazonium fluoroborate | 0 | 42.6 | 0.81 | 1.0 |
| 4 | do | 1.88 | 69.2 | 1.16 | 0.3 | diethyl etherate was added into the mixture with stirring, the mixture became turbid. After allowing to stand for 2 hours, the polymerization reaction was stopped by adding a small amount of water. The yield of trioxane homopolymer is shown by weight, based on an initial amount of trioxane. The results are shown in the following Table 13.

TABLE 13.—INFLUENCE OF SIMILAR COMPOUND TO THE ACCELERATOR IN THE HOMOPOLYMERIZATION REACTION OF TRIOXANE

| Experiment number | Compound | | Yield (wt. percent) | Inherent viscosity |
|---|---|---|---|---|
| | Kind | Part | | |
| 1 | None | 0 | 56.7 | 0.66 |
| 2 | Dimethyl sulfone | 1.91 | 92.8 | 0.77 |
| 3 | Dimethyl sulfate | 2.56 | 60.0 | 0.12 |
| 4 | Succinic anhydrate | 2.08 | 89.2 | 0.74 |
| 5 | Acetic anhydrate | 2.08 | 15.0 | 0.13 |
| 6 | Ethylene oxalate | 1.77 | 94.3 | 0.70 |
| 7 | Dimethyl oxalate | 2.39 | 55.8 | 0.62 |

What is claimed is:

1. In a process for producing a trioxane copolymer containing predominantly the recurring oxymethylene units, in which a mixture of substantially anhydrous trioxane and from about 0.1 to about 50 percent by mole, based on the number of moles of trioxane, of at least one comonomer selected from the group consisting of cyclic ethers, spirocyclic orthocarboxylic esters, vinyl compounds, cyclic esters, cyclic siloxanes, aldehydes, cyclic carbonates, isocyanates, and aromatic compounds is copolymerized by bringing the monomers into contact with from about 0.001 to about 1 percent by weight, based on the weight of trioxane, of a cationic trioxane polymerization catalyst in the presence or absence of an inert solvent at a temperature in the range from about 0° C. to about 100° C., the improvement which comprises conducting the copolymerization reaction in the presence of from about 0.1 to about 50 percent by mole, based on the number of moles of the monomers introduced into the reaction system, of at least one accelerator selected from the group consisting of sulfones having from 1 to 3 sulfonyl groups and no ethylenically unsaturated bonds, cyclic carboxylic anhydrides having 1 to 2 cyclic carboxylic anhydrous structures and cyclic oxalic esters having one six-membered cyclic oxalic ester structure, thereby accelerating the copolymerization reaction and increasing the yield and molecular weight of the copolymer.

2. In a process according to claim 1; the improvement wherein the copolymerization reaction is carried out in the presence of dimethyl sulfone.

3. In a process according to claim 1; the improvement wherein the copolymerization reaction is carried out in the presence of tetrahydrothiophene-1,1-dioxide.

4. In a process according to claim 1; the improvement wherein the copolymerization reaction is carried out in the presence of 3 - methyltetrahydrothiophene - 1,1-dioxide.

5. In a process according to claim 1; the improvement wherein the copolymerization reaction is carried out in the presence of succinic anhydride.

6. In a process according to claim 1; the improvement wherein the copolymerization reaction is carried out in the presence of diglycolic anhydride.

7. In a process according to claim 1; the improvement wherein the copolymerization reaction is carried out in the presence of ethylene oxylate.

8. In a process according to claim 1; the improvement wherein the copolymerization reaction is conducted by first mixing trioxane, the comonomer and the accelerator homogeneously and then adding the cationic trioxane polymerization catalyst.

9. In a process according to claim 1; the improvement wherein trioxane and the accelerator are mixed homogeneously first, the cationic trioxane polymerization catalyst is added then, and the comonomer is added as the polymerization reaction progresses.

10. In a process according to claim 1; the improvement wherein trioxane, a portion of the comonomer and the accelerator are mixed homogeneously first, the cationic trioxane polymerization catalyst is added then, and the remainder of the comonomer is added as the polymerization reaction progresses.

References Cited

UNITED STATES PATENTS

| 3,194,788 | 7/1965 | Kullmar et al. | 260—67 |
| 3,284,411 | 11/1966 | Martin et al. | 260—67 |
| 3,275,603 | 9/1966 | Yakimik | 260—67 |

WILLIAM H. SHORT, *Primary Examiner.*

L. M. PHYNES, *Assistant Examiner.*

U.S. Cl. X.R.

260—73